(12) United States Patent
Li et al.

(10) Patent No.: US 8,717,939 B2
(45) Date of Patent: May 6, 2014

(54) METHOD AND DEVICE FOR FRAGMENTING, TRANSMITTING AND RECEIVING NETWORK TOPOLOGY INFORMATION

(75) Inventors: Nan Li, Shenzhen (CN); Yang Liu, Shenzhen (CN); Feng Xie, Shenzhen (CN); Lin Chen, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 38 days.

(21) Appl. No.: 13/516,551

(22) PCT Filed: Jun. 7, 2010

(86) PCT No.: PCT/CN2010/073617
§ 371 (c)(1),
(2), (4) Date: Jun. 15, 2012

(87) PCT Pub. No.: WO2010/148936
PCT Pub. Date: Dec. 29, 2010

(65) Prior Publication Data
US 2012/0257541 A1    Oct. 11, 2012

(30) Foreign Application Priority Data

Dec. 16, 2009   (CN) .......................... 2009 1 0260335

(51) Int. Cl.
*H04L 12/28* (2006.01)
(52) U.S. Cl.
USPC ........................................................ 370/254
(58) Field of Classification Search
USPC ........................................................ 370/254
See application file for complete search history.

(56) References Cited

U.S. PATENT DOCUMENTS

| | | | |
|---|---|---|---|
| 5,537,414 A * | 7/1996 | Takiyasu et al. | 370/347 |
| 7,653,393 B2 * | 1/2010 | Kim et al. | 455/437 |
| 2005/0007974 A1 * | 1/2005 | Vasudevan et al. | 370/320 |
| 2007/0086465 A1 * | 4/2007 | Paila et al. | 370/394 |
| 2010/0105430 A1 * | 4/2010 | Ki et al. | 455/556.1 |

FOREIGN PATENT DOCUMENTS

| | | |
|---|---|---|
| CN | 1725870 | 1/2006 |
| CN | 101127869 A | 2/2008 |
| CN | 101409920 | 4/2009 |
| CN | 101409920 A | 4/2009 |
| CN | 101547395 | 9/2009 |
| DE | 19821819 | 12/1998 |

OTHER PUBLICATIONS

International Search Report for International Application No. PCT/CN2010/073617, mailed Sep. 23, 2010.
Yih-Shen Chen, et al., Message format for 16m HO neighbor advertisement, Aug. 29, 2009, Project IEEE 802.16.
Jaehyuk Jang, et al., Reply comment to HO DG AWD text proposal on Intra-16m HO, May 6, 2009, Project IEEE 802.16.

* cited by examiner

*Primary Examiner* — Clemence Han
(74) *Attorney, Agent, or Firm* — McAndrews Held & Malloy, Ltd.

(57) ABSTRACT

The invention discloses a method for fragmenting, transmitting and receiving network topology information. In the transmitting method, a BS transmits fragmentations of a neighborhood broadcast message carrying network topology information, wherein at least one of the fragmentations carries indication information which can indicate changed fragmentations. The solution can decrease the time delay of the information acquisition and subsequent operation.

28 Claims, 4 Drawing Sheets

The BS transmits the neighborhood broadcast message fragmentations, each neighborhood broadcast message fragmentation carries the system information of one or more types of BSs, each neighborhood broadcast message fragmentation carries: information about the number of BS types, identification information of BS types, information about the number of BSs corresponding to each BS type, and system information corresponding to each BS; the first neighborhood broadcast message fragmentation carries the following fragmentation information: total fragmentations, current fragmentation index, configuration change count and fragmentation change bitmap — S201

The mobile station receives the neighborhood broadcast message — S203

```
┌─────────────────────────────────────────────────────────────────┐
│   The BS transmits the neighborhood broadcast message           │
│   fragmentations, each neighborhood broadcast message           │
│   fragmentation only carries the system information of one      │
│   type of one or more BSs, each neighborhood broadcast          │
│   message fragmentation carries: information about the number   │
│   of BSs and system information corresponding to each BS. Or,   │
│   the BS may further indicate that this message is used for     │
│   carrying the system information of which type of BS in each   │
│   neighborhood broadcast message fragment, at this time, each   │── S301
│   neighborhood broadcast message fragmentation needs to be      │
│   carried with at least one of the following items:             │
│   identification information of BS types, information about the │
│   number of BSs in the message and system information           │
│   corresponding to each BS; the first neighborhood broadcast    │
│   message fragmentation carries the following fragmentation     │
│   information: total fragmentations, current fragmentation      │
│   index, configuration change count and fragmentation change    │
│   bitmap                                                        │
└─────────────────────────────────────────────────────────────────┘
                                  │
                                  ▼
┌─────────────────────────────────────────────────────────────────┐
│   The mobile station receives the neighborhood broadcast message│── S303
└─────────────────────────────────────────────────────────────────┘
```

Fig. 3

```
┌─────────────────────────────────────────────────────────────────┐
│   The BS transmits the neighborhood broadcast message           │
│   fragmentations, each neighborhood broadcast message           │
│   fragmentation carries the system information of one or more   │
│   types of BSs, each neighborhood broadcast message             │
│   fragmentation carries: information about the number of BS     │
│   types, identification information of BS types, information    │
│   about the number of BSs corresponding to each BS type, and    │── S401
│   system information corresponding to each BS; each             │
│   neighborhood broadcast message fragmentation carries the      │
│   following fragmentation information: total fragmentations,    │
│   current fragmentation index, configuration change count and   │
│   fragmentation change bitmap                                   │
└─────────────────────────────────────────────────────────────────┘
                                  │
                                  ▼
┌─────────────────────────────────────────────────────────────────┐
│   The mobile station receives the neighborhood broadcast message│── S403
└─────────────────────────────────────────────────────────────────┘
```

Fig. 4

The BS transmits the neighborhood broadcast message fragmentations, each neighborhood broadcast message fragmentation only carries the system information of one type of one or more BSs, each neighborhood broadcast message fragmentation carries: information about the number of BSs and system information corresponding to each BS. Or, the BS may further indicate that this message is used for carrying the system information of which type of BS in each neighborhood broadcast message fragment, at this time, each neighborhood broadcast message fragmentation needs to be carried with: identification information of BS types, information about the number of BSs in the message and system information corresponding to each BS; each neighborhood broadcast message fragmentation carries the following fragmentation information: total fragmentations, current fragmentation index, configuration change count and fragmentation change bitmap — S501

↓

The mobile station receives the neighborhood broadcast message — S503

Fig. 5

The BS transmits the neighborhood broadcast message fragmentations, each neighborhood broadcast message fragmentation carries the system information of one or more types of BSs, each neighborhood broadcast message fragmentation carries: information about the number of BS types, identification information of BS types, information about the number of BSs corresponding to each BS type, and system information corresponding to each BS; each neighborhood broadcast message fragmentation carries at least the following fragmentation information: total fragmentations, current fragmentation index, configuration change count and indication information which indicates whether the current fragment is changed — S601

↓

The mobile station receives the neighborhood broadcast message — S603

METHOD AND DEVICE FOR FRAGMENTING, TRANSMITTING AND RECEIVING NETWORK TOPOLOGY INFORMATION

FIELD OF THE INVENTION

The invention relates to communication field, and in particular to a method and a device for fragmenting, transmitting and receiving network topology information.

BACKGROUND OF THE INVENTION

In radio communication systems, Base Stations (BS) are utilized to provide radio coverage through specified radio channels within certain geographic ranges, and the geographic ranges are called cells. Generally, the BSs are located in the center of the cells. According to the size of coverage range, BSs may be divided into Macro Base Stations (Macro BS), Micro Base Stations (Micro BS), Pico Base Stations (Pico BS) and Femto Base Stations (Femto BS). In addition, in order to expand coverage or capacity, one or more Relay Stations (RS) may be arranged between a mobile station and a BS. For the mobile station, the RS is equivalent to a BS.

According to the supported communication protocols, BSs/RSs may be divided into advanced control stations and legacy control stations, wherein the advanced control stations are Advanced BSs/Advanced RSs (ABS/ARS) supporting new communication protocols, and the legacy control stations are BSs/RSs which can support legacy communication protocols. Similarly, mobile stations further may be divided into Advanced Mobile Stations (AMS) and legacy mobile stations.

IEEE802.16 standard is an air interface standard proposed in allusion to microwave frequency band, including specifications for the physical layer (PHY) and the Media Access Control (MAC) layer. In the IEEE802.16 standard, the IEEE802.16m including a relay structure is the latest standard technique at present, and the IEEE802.16m is based on legacy standards such as the IEEE802.16e and the IEEE802.16j.

The World Interoperability for Microwave Access (WiMAX) is a Broadband Wireless Access Metropolitan Area Network technique based on the IEEE802.16 standard. Based on above description, the advanced control stations (BSs/RSs supporting the IEEE802.16m protocol) can be compatible with and support legacy mobile stations (mobile stations supporting the IEEE802.16e protocol), similarly, advanced mobile stations (mobile stations supporting the IEEE802.16m protocol) further can be accessed to legacy control stations (base stations supporting the IEEE802.16e protocol or relay stations supporting the IEEE802.16j protocol).

When a mobile station moves to another cell from one cell, in order to keep communication, handover is required. In relevant technologies, the handover process may be divided into several sub-processes: 1. acquiring network topology information; 2. preparing to handover and initiating; 3. synchronizing destination station downlink; 4. stopping the connection between the mobile station and the current base station, and entering the new cell. In the above, the process of acquiring network topology information means that the BS broadcasts a message containing neighborhood BS system information periodically, which is called neighborhood broadcast message below. After receiving the neighborhood broadcast message, the mobile station belonged to the BS demodulates the neighborhood broadcast message to acquire the neighborhood BS information, and uses it as a reference of scanning. In the above, the neighborhood BS means one adjacent to the current service BS of the mobile station or one in a neighboring cell.

When a legacy BS transmits the neighborhood broadcast message through the broadcast way, if there are many neighborhood BSs, the neighborhood broadcast message needs to be carried with system information of multiple BSs, as a result, the number of bytes of this message is very large, therefore a method for fragmenting one neighborhood broadcast message into a plurality of fragmentations for transmission is adopted.

Generally, the neighborhood broadcast message will carry one change count, if the count value is changed, it is indicated that the neighborhood broadcast message is updated. If the neighborhood broadcast message is fragmented, it is required that, only after receiving all fragmentations of the neighborhood broadcast message, the mobile station can acquire the updated neighborhood BS system information and perform operations related to handover, such as scanning of the neighborhood BS.

SUMMARY OF THE INVENTION

The invention is proposed in allusion to the problem that, when the BS transmits a network topology message to the mobile station, the mobile station may perform relevant operations only after receiving all neighborhood broadcast message fragmentations. Therefore, the present invention provides a method and a device for transmitting a network topology message, to solve at least one of above problems.

According to one aspect of the invention, a method for transmitting network topology information is provided.

The method for transmitting network topology information according to the invention comprises: a BS transmitting fragmentations of a neighborhood broadcast message carrying network topology information; wherein at least one of the fragmentations carries indication information which can indicate changed fragmentations.

According to another aspect of the invention, a method for fragmenting network topology information is provided.

The method for fragmenting network topology information according to the invention comprises: fragmenting a neighborhood broadcast message carrying network topology information; wherein, at least one of the fragmentations carries indication information which can indicate changed fragmentations.

According to further another aspect of the invention, a method for receiving network topology information is provided.

The method for receiving network topology information according to the invention comprises: a mobile station receiving fragmentations of a neighborhood broadcast message carrying network topology information; wherein at least one of the fragmentations carries indication information which can indicate changed fragmentations.

According to yet another aspect of the invention, a device for transmitting network topology information is provided.

The device for transmitting network topology information according to the invention is configured to transmit each fragmentation of a neighborhood broadcast message to a mobile station, wherein at least one of the fragmentations carries indication information which can indicate changed fragmentations.

According to yet another aspect of the invention, a device for fragmenting network topology information is provided.

The device for fragmenting network topology information according to the invention is configured to fragment a neighborhood broadcast message carrying network topology information, wherein at least one of the fragmentations carries indication information which can indicate changed fragmentations.

According to yet another aspect of the invention, a device for receiving network topology information is provided.

The device for receiving network topology information according to the invention is configured to receive fragmentations of the neighborhood broadcast message carrying network topology information, wherein at least one of the fragmentations carries indication information which can indicate changed fragmentations.

According to another aspect of the invention, a BS is provided.

The BS according to the invention is configured to transmit each fragmentation of a neighborhood broadcast message to a mobile station, wherein at least one of the fragmentations carries indication information which can indicate changed fragmentations.

Through the invention, the BS transmits each fragmentation of the neighborhood broadcast message carrying network topology information to the mobile station, wherein at least one of the fragmentations carries indication information which can, indicate the changed fragmentations. The problem that, when the BS transmits a network topology message to a mobile station, the mobile station may perform relevant operations only after receiving all fragmentations of the neighborhood broadcast message, is solved, and further the time delay of the, information acquisition and subsequent operation can be decreased.

BRIEF DESCRIPTION OF THE DRAWINGS

Drawings illustrated herein are provided for further understanding of the invention and form a part of the application, the exemplary embodiments of the invention and descriptions thereof are used for explaining the invention and do not form any improper limit for the invention. In the drawings:

FIG. 3 shows a flow diagram of a method for transmitting and receiving network topology information according to Embodiment 2 of the present invention;

FIG. 4 shows a flow diagram of a method for transmitting and receiving network topology information according to Embodiment 3 of the present invention;

FIG. 5 shows a flow diagram of a method for transmitting and receiving network topology information according to Embodiment 4 of the present invention;

FIG. 6 shows a flow diagram of a method for transmitting and receiving network topology information according to Embodiment 5 of the present invention;

DETAILED DESCRIPTION OF THE INVENTION

The invention will be described in details below with reference to drawings and in conjunction with embodiments. It should be noted that embodiments in the application and features in the embodiments may be combined together if not conflict.

Through an embodiment of the present invention, first, a method for fragmenting network topology information is provided.

The method for fragmenting network topology information according to the embodiment of the present invention comprises the following processing: fragmenting the neighborhood broadcast message carrying network topology information, wherein at least one of the fragmentations carries indication information which can indicate changed fragmentations.

Preferably, the basis for fragmenting may be: the BS types carried in the neighborhood broadcast message, or size of current resources used for transmitting a broadcast message by a service BS.

Through the above embodiment, at least one of all the fragmentations of the neighborhood broadcast message is carried with the indication information which can indicate the changed fragmentations, so that the mobile station can perform operations related to handover, such as scanning of the neighborhood BS, without needing to receive all neighborhood broadcast messages fragmentations, therefore the problem of long time delay of the information acquisition and subsequent operation can be avoided.

Through an embodiment of the present invention, a method for transmitting network topology information is further provided.

The method for transmitting network topology information according to the embodiment of the present invention comprises the following processing: a BS transmitting fragmentations of a neighborhood broadcast message carrying network topology information; wherein at least one of the fragmentations carries indication information which can indicate changed fragmentations.

Through the above embodiment, at least one of all fragmentations of the neighborhood broadcast message is carried with the indication information which can indicate the changed fragmentations, so that the mobile station can perform operations related to handover, such as scanning of the neighborhood BS, without needing to receive all fragmentations of the neighborhood broadcast message, therefore the problem of long time delay of the information acquisition and subsequent operation can be avoided.

Preferably, the indication information which can indicate the changed fragmentations may comprise but not limited to one of the following items: indication information which indicates whether each one of all the fragmentations is changed, and indication information which indicates whether a current fragmentation is changed.

Preferably, the indication information, which indicates whether each one of all the fragmentations is changed, is transmitted through the following way: according to a preset rule, the indication information, which indicates whether each one of all the fragmentations is changed, is carried in one or more fragmentations of the neighborhood broadcast message for transmission.

In the above, the preset rule may be one of the following items:

(1) the BS carrying the indication information in the first neighborhood broadcast message fragmentation for transmission;

(2) the BS carrying the indication information in each fragmentation of the neighborhood broadcast message for transmission;

(3) the BS carrying the indication information in any fragmentation of the neighborhood broadcast message for transmission.

In the above, when the indication information is carried in any fragmentation (may be any one or more fragmentations) of the neighborhood broadcast message for transmission, each fragmentation of the neighborhood broadcast message further needs to be carried with: identification information which indicates whether the indication information is carried in the fragmentation.

Preferably, the indication information, which indicates whether the current fragmentation is changed, may be transmitted through the following way: the BS carrying the indication information in each fragmentation of the neighborhood broadcast message for transmission.

With above processing way, many selections are provided to the way of transmitting fragmentation information.

Preferably, the fragmentation information which is carried in each fragmentation further includes at least one of the following items: total fragmentations, current fragmentation index, and a configuration change count of the neighborhood broadcast message.

Preferably, when each fragmentation of the neighborhood broadcast message carries system information of at least one type of BS, each fragmentation of the neighborhood broadcast message further needs to be carried with at least one of the following parameters: information of number of BS types, identification information of BS types, information of number of BSs corresponding to each BS type, and system information corresponding to each BS.

Preferably, when each fragmentation of the neighborhood broadcast message carries system information of only one type of BS, each fragmentation of the neighborhood broadcast message further needs to be carried with at least one of the following parameters: identification information of the BS type, number of BSs, and system information corresponding to each BS.

Preferably, when each fragmentation of the neighborhood broadcast message carries system information of only one type of BS, and a mobile station can obtain the corresponding relationship between the fragmentation and the BS type, each fragmentation of the neighborhood broadcast message further needs to be carried with at least one of the following parameters: information of number of BSs and system information corresponding to each BS.

Preferably, the mobile station obtains the corresponding relationship between the fragmentation and the BS type through at least one of the following ways:

(1) the mobile station obtaining the corresponding relationship which is preset (for example, defined in the standard);

(2) the mobile station receiving the corresponding relationship sent by the BS in a broadcast type message or channel.

Preferably, the broadcast type message includes but not limited to: system configuration description message; the broadcast type channel includes but not limited to: super frame header.

Preferably, the BS transmits each fragmentation of the neighborhood broadcast message through the following ways: broadcast way and/or unicast way.

Therefore, there are further many selectable ways through which the BS transmits the neighborhood broadcast message.

Preferably, when the BS transmits each fragmentation of the neighborhood broadcast message through the broadcast way, the BS transmits each fragmentation in same or different periods. The BS determines the different periods according to a neighborhood BS type and/or size of coverage range of a neighborhood BS carried in each fragment.

Preferably, when the BS transmits each fragmentation of the neighborhood broadcast message through the unicast way, the BS transmits each fragmentation as response to a request of a mobile station; or the BS actively transmits each fragmentation to the mobile station.

Preferably, the BS comprises at least one of the following: macro BS, micro BS, pico BS, femto BS and relay station.

Preferably, radio communication systems applying the method for transmitting network topology information include but not limited to: World Interoperability for Microwave Access (WiMAX) system, Global System for Mobile Communications (GSM) system, Code Division Multiple Access (CDMA) system, Personal Handy-phone System (PHS), Enhanced Data rate for GSM Evolution (EDGE) system, CDMA2000 system, Time Division-synchronization Code Division Multiple Access (TD-SCDMA) system, High Speed Packet Access (HSPA) system, Wideband Code Division Multiple Access (WCDMA) system, Evolution-Data Optimized (EVDO) system, High-Speed OFDM Packet Access (HSOPA) system, and Long Term Evolution (LTE) system.

According to the embodiment, a method for transmitting neighborhood broadcast message is provided, at least one of fragmentations of the neighborhood broadcast message is carried with indication information which can indicate the changed fragmentations, wherein the indication information may include: indication information which indicates whether each one of all the fragmentations is changed. The indication information may further include: indication information which indicates whether a current fragmentation is changed.

According to an embodiment of the present invention, a method for receiving neighborhood broadcast information is provided.

The method for receiving neighborhood broadcast information according to the embodiment of the present invention comprises the following processing: a mobile station receiving fragmentations of a neighborhood broadcast message carrying network topology information; wherein at least one of the fragmentations carries indication information which can indicate changed fragmentations.

During specific implementation, the mobile station can combine the fragmentations into partial or complete neighborhood broadcast message according to the indication information carried in the received fragmentations. Please refer to descriptions in FIG. 2 to FIG. 8 for specific process, which will not be described again herein.

Through the embodiment, a method for receiving neighborhood broadcast information is provided, which is corresponding to the method for transmitting neighborhood broadcast information. During receiving process, the mobile station can perform operations related to handover, such as scanning of a neighborhood BS, without needing to receive all fragmentations of the neighborhood broadcast message, therefore the problem of long time delay of the information acquisition and subsequent operation can be avoided.

Figure 1:
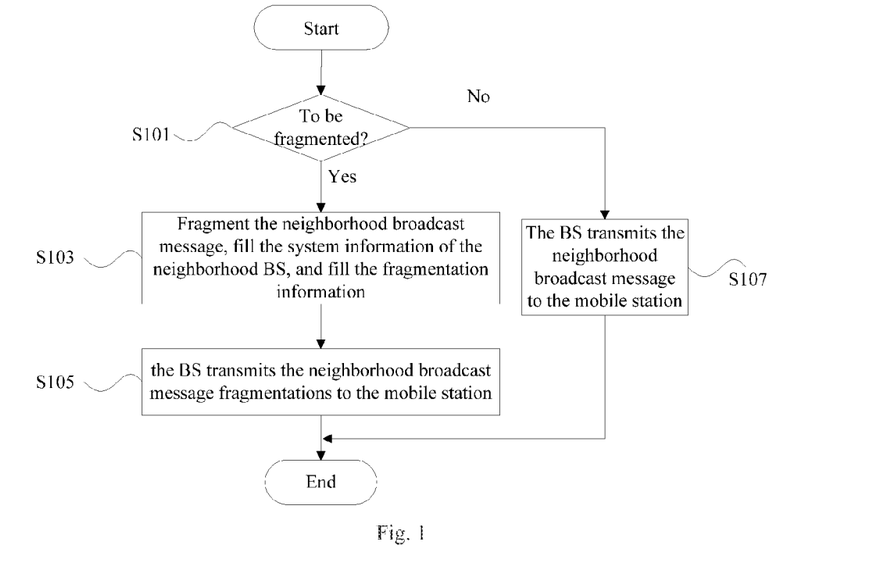
FIG. 1 shows a flow diagram of a method for transmitting network topology information according to a preferred embodiment of the present invention.

FIG. 1 shows a flow diagram of a method for transmitting network topology information according to a preferred embodiment of the present invention. As shown in FIG. 1, the method for fragmenting and transmitting network topology information according to the preferred embodiment of the present invention comprises the following processing (S101-S107).

S101: it is judged whether acquired system information of a neighborhood BS needs to be fragmented, if not, return to S107, wherein, the basis for judging whether it needs to be fragmented is: BS types carried in a neighborhood broadcast message, or size of current resources allocated by the service BS for transmitting a broadcast message.

S103: when the acquired system information of the neighborhood BS needs to be fragmented, the neighborhood broadcast message is fragmented according to the fragmenting basis in S101.

During specific implementation, when fragmenting is executed according to the carried neighborhood BS type, each neighborhood broadcast message fragmentation just carries the system information of one type of one or more BSs, and the system information of one type of one or more BSs can be transmitted in one or more neighborhood broadcast message fragmentations. The corresponding relationship between the neighborhood broadcast message fragmentations and the type of the BSs may be preset (for example, defined in the standard), or, notified to the mobile station by the BS in a broadcast type message (for example, system configuration description message (AAI-SCD message)) or channel (for example, super frame header (SFH)). At this case, parameters need to be carried in each neighborhood broadcast message fragmentation include at least one of the following: number of BSs in the message and system information corresponding to each BS. The BS may further indicate that this message is used for carrying the system information of which type of BS in each neighborhood broadcast message fragmentation. At this case, parameters need to be carried in each neighborhood broadcast message fragmentation include at least one of the following: identification information of BS types, information of number of BSs in the message and system information corresponding to each BS.

When fragmenting is executed only according to the size of the current resources allocated by the service BS for transmitting the broadcast message, in this case, bandwidth for transmitting broadcast message in the previous subframe is not enough to transmit the complete neighborhood broadcast message, each neighborhood broadcast message fragmentation may carry system information of one or more types of BSs, and parameters need to be carried in each neighborhood broadcast message fragmentation include at least one of the following: information of number of BS types, identification information of BS types, information of number of BSs in each type and system information corresponding to each BS.

Preferably, the BS type comprises at least one of the following: macro BS, micro BS, pico BS, femto BS and relay station.

Further, the BS carries the indication information, which indicates whether each one of all the fragmentations is changed, in the first neighborhood broadcast message fragmentation to indicate whether each neighborhood broadcast message fragmentation is changed. Specifically, the indication information may be a fragmentation change bitmap, size of the bitmap is equal to the total fragmentations, and each bit corresponds to one neighborhood broadcast message fragmentation. If the neighborhood broadcast message fragmentation is changed, the corresponding bit value is 1; otherwise the bit value is 0, vice versa. The fragmentation information which may be carried in each fragmentation further includes at least one of the following items: total fragmentations, used for indicating the number of all fragmentations of the neighborhood broadcast message; current fragmentation index, used for indicating a serial number of the current fragmentation of the neighborhood broadcast message; configuration change count of the neighborhood broadcast message, used for indicating the changes of the neighborhood broadcast message, when the neighborhood broadcast message is changed once, the count value is added by 1.

Or, the BS carries the indication information, which indicates whether each one of all the fragmentations is changed, in each neighborhood broadcast message fragmentation. The fragmentation information which may be carried in each fragmentation further includes at least one of the following items: total fragmentations, current fragmentation index, and configuration change count of the neighborhood broadcast message.

Or, the BS carries the indication information, which indicates whether each one of all fragmentations is changed, in any neighborhood broadcast message fragmentation(s). The fragmentation information which may be carried in each fragmentation further includes at least one of the following items: total fragmentations, current fragmentation index, configuration change count of the neighborhood broadcast message, and identification information which identifies whether the indication information is carried.

Or, the BS carries the indication information, which indicates whether the current fragmentation is changed, in each neighborhood broadcast message fragmentation. Specifically, the indication information may be one bit, if the value of the bit is 1, indicating that the current fragmentation is changed, otherwise the value is 0, vice versa. The fragmentation information which may be carried in each fragmentation may further include at least one of the following items: total fragmentations, current fragmentation index and configuration change count of the neighborhood broadcast message.

S105: the BS transmits the neighborhood broadcast message fragmentations to the mobile station in turn according to the index of the fragmentations. Specifically, the transmission way may be broadcast or unicast or combination of both ways. When transmitting through the broadcast way, the transmission period of all the neighborhood broadcast message fragmentations may be same, or different transmission periods may be used according to a neighborhood BS type and/or size of coverage range of a neighborhood BS carried in each neighborhood broadcast message fragmentation. When transmitting through the unicast way, the BS may transmit neighborhood broadcast message as response to a request of a mobile station; or the BS actively transmits neighborhood broadcast message to the mobile station.

S107: for a neighborhood broadcast message without fragmenting, the BS transmits the message to the mobile station. The transmission way may be broadcast or unicast or combination of both ways. When the BS transmits the message to the mobile station through unicast way, the BS may transmit the neighborhood broadcast message as response to a request of the mobile station, or, the BS actively transmits the neighborhood broadcast message to the mobile station.

With the method for transmitting a neighborhood broadcast message in the embodiment, the BS carries the indication information which can indicate the changed fragmentations in the neighborhood broadcast message fragmentations, so that the mobile station can perform operations related to handover, such as scanning of neighborhood BS, without needing to receive all neighborhood broadcast messages fragmentations, therefore the problem of long time delay of the information acquisition and subsequent operation can be avoided.

Embodiment 1

Figure 2:
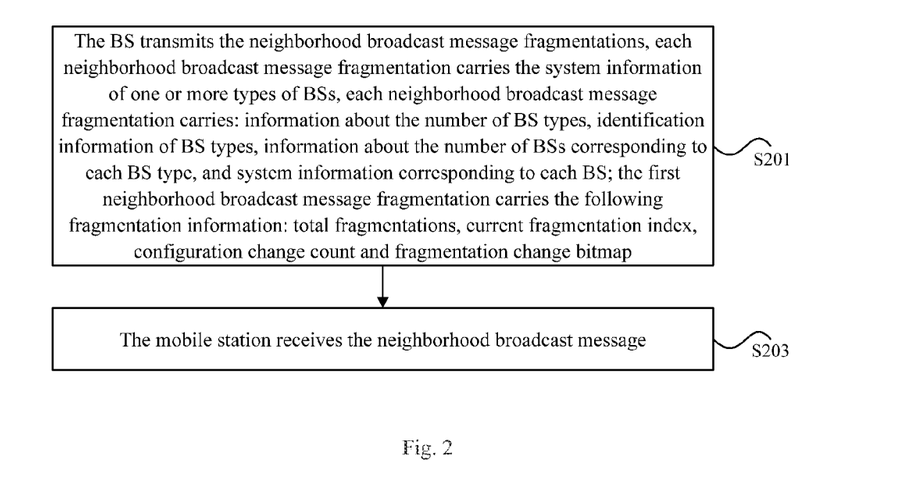
FIG. 2 shows a flow diagram of a method for transmitting and receiving network topology information according to Embodiment 1 of the present invention.

FIG. 2 shows a flow diagram of the method for transmitting and receiving network topology information according to embodiment 1 of the present invention. As shown in FIG. 2, the method for transmitting network topology information according to embodiment 1 of the present invention comprises the following processing (S201-S203).

S201: the BS transmits neighborhood broadcast message fragmentations (AAI_NBR-ADV message) carrying network topology information, wherein each neighborhood broadcast message fragmentation carries system information of one or more types of BSs.

Preferably, each neighborhood broadcast message fragmentation carries at least one of the following parameters: information of number of BS types, identification information of BS types, information of number of BSs corresponding to each BS type, and system information corresponding to each BS. The BS type comprises at least one of the following: macro BS, micro BS, pico BS, femto BS and relay station.

During specific implementation, the BS carries fragmentation change bitmap in the first neighborhood broadcast message fragmentation sent to a mobile station to indicate whether each neighborhood broadcast message fragmentation is changed The size of the bitmap is equal to the total fragmentations, each bit corresponds to one neighborhood broadcast message fragmentation. If the neighborhood broadcast message fragmentation is changed, the corresponding bit value is 1, otherwise the bit value is 0, vice versa. The fragmentation information which may further be carried in each fragmentation includes at least one of the following items: total fragmentations, used for indicating the number of all fragmentations of the neighborhood broadcast message; current fragmentation index, used for indicating a serial number of the current fragmentation of the neighborhood broadcast message; change count of the neighborhood broadcast message, used for indicating the changes of the neighborhood broadcast message, when the neighborhood broadcast message is changed once, the count value is added by 1.

Preferably, the BS transmits all neighborhood broadcast message fragmentations through the broadcast way.

S203: the mobile station receives the first neighborhood broadcast message fragmentation, acquires total fragmentations, current fragmentation index and configuration change count. The mobile station compares whether the count is equal to the value of the count saved last time, if the count is equal to the value of the count saved last time, it is indicated that the neighborhood broadcast message is not changed, so it is unnecessary to analyze other information of this fragmentation and all subsequent fragmentations. If the configuration change count received this time is added by 1 when compared with the value of the count saved last time, it is indicated that the neighborhood broadcast message is changed once, so it is necessary to continuously analyze the fragmentation change bitmap, judge which fragmentations change according to the value of the bitmap, and only analyze the changed fragmentations.

During specific implementation, if the difference between the change count received this time and the value saved last time is larger than 1, it is indicated that the neighborhood broadcast message is changed many times and the mobile station is failed to receive. At this case, the mobile station needs to receive and analyze all fragmentations to acquire the updated neighborhood broadcast message. The mobile station may judge whether all neighborhood broadcast message fragmentations are received according to the total fragmentations and fragmentation indexes.

In this way, in a normal case, that is, when the neighborhood broadcast message is changed once, the mobile station can quickly judge whether there are fragmentations changed and acquire the changed fragmentations' indexes according to the fragmentation information carried in the neighborhood broadcast message fragmentation, therefore the mobile station can acquire the updated network topology information without receiving all neighborhood broadcast message fragmentations, so as to perform operations related to handover, such as scanning.

Embodiment 2

FIG. 3 shows a flow diagram of a method for transmitting and receiving network topology information according to embodiment 2 of the present invention. As shown in FIG. 3, the method for transmitting network topology information according to embodiment 2 of the present invention comprises the following processing (S301-S303).

S301: a neighborhood broadcast message carrying network topology information is fragmented according to BS types, wherein each neighborhood broadcast message fragmentation (further called each fragmentation of the neighborhood broadcast message) carries system information of one or more BSs of only one type, and the system information of one or more BSs of a same type can be transmitted in one or more neighborhood broadcast message fragmentations.

For example, fragmentation 1 is used for transmitting the system information of macro BS, fragmentation 2 is used for transmitting the system information of micro BS, and fragmentations 3 and 4 are used for transmitting the system information of pico BS. The corresponding relationship between the fragmentations and the types of the BSs may be preset (for example, defined in the standard), or, notified to the mobile station by the BS in a broadcast type message or channel. For example, the corresponding relationship is transmitted to the mobile station in AAI-SCD message or SFH. At this case, each neighborhood broadcast message fragmentation needs to be carried with at least one of the following items: number of BSs in the message and system information corresponding to each BS. Or, the BS may further indicate that this message is used for carrying the system information of which type of BS in each neighborhood broadcast message fragment. At this case, each neighborhood broadcast message fragmentation needs to be carried with at least one of the following items: identification information of BS types, information of number of BSs in the message and system information corresponding to each BS.

During specific implementation, the BS carries a fragmentation change bitmap in the first neighborhood broadcast message fragmentation sent to the mobile station, and the fragmentation information which may be carried in each fragmentation includes at least one of the following items: total fragmentations, current fragmentation index, and configuration change count. The first neighborhood broadcast message fragmentation may further carry the corresponding relationship between the fragmentations and the types of the BSs.

The BS transmits all neighborhood broadcast message fragmentations to the mobile station through the broadcast way.

S303: the mobile station acquires the corresponding relationship between the fragmentations and the types of the BSs according to above method.

The mobile station receives the first neighborhood broadcast message fragmentation, acquires total fragmentations, current fragmentation index and configuration change count, and compares whether the count is equal to the value of the count saved last time. If the count is equal to the value of the count saved last time, it is indicated that the neighborhood broadcast message is not changed, so it is unnecessary to analyze other information of this fragmentation and all subsequent fragmentations. If the configuration change count received this time is added by 1 when compared with the value of the count saved last time, it is indicated that the neighborhood broadcast message is changed once, the mobile station continuously analyzes the fragmentation change bitmap, judge which fragmentation is changed according to the value of the bitmap, and only analyze the changed fragmentation. At this case, if the mobile station just needs to switch to a pico BS, the mobile station may just pay attention to whether the bit corresponding to the pico BS type is changed. If the bit is changed, the mobile station receives and analyzes corresponding neighborhood broadcast message fragmentation. For other types of BSs except pico BS, no matter their system information is changed or not, the mobile station may not perform analysis.

During specific implementation, if the difference between the configuration change count received this time and the value saved last time is larger than 1, it is indicated that the neighborhood broadcast message is changed many times and the mobile station is failed to receive. At this case, the mobile station needs to receive and analyze all fragmentations to acquire the updated neighborhood broadcast message. The mobile station may judge whether all neighborhood broadcast message fragmentations are received according to the total fragmentations and fragmentation indexes.

Embodiment 3

FIG. 4 shows a flow diagram of a method for transmitting and receiving network topology information according to embodiment 3 of the present invention. As shown in FIG. 4, the method for transmitting network topology information according to embodiment 3 of the present invention comprises the following processing (S401-S403).

S401: the BS transmits neighborhood broadcast message fragmentations carrying network topology information, wherein each neighborhood broadcast message fragmentation carries system information of one or more types of BSs.

Preferably, each neighborhood broadcast message fragmentation carries at least one of the following parameters: number of BS types, identification information of BS types, number of BSs corresponding to each BS type, and system information corresponding to each BS. The BS types comprise at least one of the following: macro BS, micro BS, pico BS, femto BS and relay station.

The BS carries a fragmentation change bitmap in each neighborhood broadcast message fragmentation sent to a mobile station. The fragmentation information which may further be carried in each fragmentation includes at least one of the following items: total fragmentations, current fragmentation index, and configuration change count. The BS transmits all neighborhood broadcast message fragmentations to the mobile station through the broadcast way.

S403: the mobile station receives any neighborhood broadcast message fragmentation and acquires the fragmentation information.

Compared to embodiment 1 and embodiment 2, the embodiment 3 has the advantages that: the mobile station can receive any neighborhood broadcast message fragmentation to acquire the fragmentation information. The mobile station acquires total fragmentations, current fragmentation index, and configuration change count, and compares whether the count is equal to the value of the count saved last time. If the count is equal to the value of the count saved last time, it is indicated that the neighborhood broadcast message is not changed, so it is unnecessary to analyze other information of this fragmentation and all subsequent fragmentations. If the configuration change count received this time is added by 1 when compared with the value of the count saved last time, it is indicated that the neighborhood broadcast message is changed once, the mobile station continuously analyzes the fragmentation change bitmap, judges which fragmentation is changed according to the value of the bitmap, and only analyzes the changed fragmentation. If the difference between the change count received this time and the value saved last time is larger than 1, it is indicated that the neighborhood broadcast message is changed many times and the mobile station is failed to receive, at this case, the mobile station needs to receive and analyze all fragmentations to acquire the updated neighborhood broadcast message. The mobile station may judge whether all neighborhood broadcast message fragmentations are received according to the total fragmentations and fragmentation indexes.

Embodiment 4

FIG. 5 shows a flow diagram of a method for transmitting and receiving network topology information according to embodiment 4 of the present invention. As shown in FIG. 5, the method for transmitting network topology information according to embodiment 4 of the present invention comprises the following processing (S501-S503).

S501: a neighborhood broadcast message caring network topology information is fragmented according to BS types, wherein each neighborhood broadcast message fragmentation carries system information of one or more BSs of only one type, and the system information of one or more BSs of a same type can be transmitted in one or more neighborhood broadcast message fragmentations.

The corresponding relationship between the fragmentations and the types of the BSs may be preset, or, notified to the mobile station by the BS in a broadcast type message or channel. For example, the corresponding relationship is transmitted to the mobile station in AAI-SCD message or SFH.

Preferably, each neighborhood broadcast message fragmentation carries at least one of the following parameters: number of BSs in the message and system information corresponding to each BS. Or, the BS may further indicate that this message is used for carrying the system information of which type of BS in each neighborhood broadcast message fragment. At this case, each neighborhood broadcast message fragmentation carries at least one of the following parameters: identification information of BS types, number of BSs in the message and system information corresponding to each BS.

The BS carries a fragmentation change bitmap in each neighborhood broadcast message fragmentation sent to the mobile station, and fragmentation information which may further be carried in each fragmentation includes at least one of the following items: total fragmentations, current fragmentation index, and configuration change count.

Preferably, the BS transmits all neighborhood broadcast message fragmentations to the mobile station through the broadcast way.

S503: when the mobile station is not limited to switch to a certain special type of BSs, the mobile station receives any neighborhood broadcast message fragmentation.

In the above, the mobile station acquires total fragmentations, current fragmentation index, and configuration change count, and compares whether the count is equal to the value of the count saved last time. If the count is equal to the value of the count saved last time, it is indicated that the neighborhood broadcast message is not changed, so it is unnecessary to analyze other information of this fragmentation and all subsequent fragmentations. If the configuration change count received this time is added by 1 when compared with the value of the count saved last time, it is indicated that the neighborhood broadcast message is changed once, the mobile station continuously analyzes the fragmentation change bitmap, judges which fragmentation is change according to the value of the bitmap, and only analyzes the changed fragmentation.

During specific implementation if the difference between the change count received this time and the value saved last time is larger than 1, it is indicated that the neighborhood broadcast message is changed many times and the mobile station is failed to receive. At this case, the mobile station needs to receive and analyze all fragmentations to acquire the updated neighborhood broadcast message. The mobile station may judge whether all neighborhood broadcast message fragmentations are received according to the total fragmentations and fragmentation indexes.

If the mobile station just needs to switch to a certain special type of BS, for example, a pico BS. As the mobile station has acquired the corresponding relationship between the fragmentations and the types of BSs, after receiving the neighborhood broadcast message fragmentation, the mobile station judges whether the fragmentation is a pico BS fragmentation according to the fragmentation index. If the fragmentation is not a pico BS fragmentation, it does not analyze other contents of the current fragmentation. If the fragmentation is a pico BS fragmentation, it continuously acquires the change count and compares whether the count is equal to the value of the count saved last time. If the count is equal to the value of the count saved last time, it is indicated that the neighborhood broadcast message is not changed, so it is unnecessary to analyze other information of this fragmentation and all subsequent fragmentations. If the configuration change count received this time is added by 1 when compared with the value of the count saved last time, it is indicated that the neighborhood broadcast message is changed once, so it continuously analyzes the fragmentation change bitmap, judges which fragmentation is changed according to the value of the bitmap, and only analyzes the changed fragmentation. For other types of BSs except pico BS, no matter their system information is changed or not, the mobile station may not perform analysis. If the difference between the change count received this time and the value saved last time is larger than 1, it is indicated that the neighborhood broadcast message is changed many times and the mobile station is failed to receive. At this case, the mobile station needs to receive and analyze all fragmentations to acquire the updated neighborhood broadcast message. The mobile station may judge whether all neighborhood broadcast message fragmentations are received according to the total fragmentations and fragmentation indexes.

Embodiment 5

FIG. 6 shows a flow diagram of a method for transmitting and receiving network topology information according to embodiment 5 of the present invention. As shown in FIG. 6, the method for transmitting network topology information according to embodiment 5 of the present invention comprises the following processing (S601-S603).

S601: a BS transmits neighborhood broadcast message fragmentations carrying network topology information, wherein each neighborhood broadcast message fragmentation carries system information of one or more types of BSs.

Preferably, each neighborhood broadcast message fragmentation carries at least one of the following parameters: number of BS types, identification information of BS types, information of number of BSs corresponding to each BS type, and system information corresponding to each BS. The BS types comprise at least one of the following: macro BS, micro BS, pico BS, femto BS and relay station.

The BS carries indication information which indicates whether the current fragmentation is changed in each neighborhood broadcast message fragmentation sent to a mobile station. Specifically, the indication information which indicates whether the current fragmentation is changed may be one bit. If the value of the bit is 0, it is indicated that the current fragmentation is not changed, and if the value of the bit is 1, it is indicated that the current fragmentation is changed, vice versa. Fragmentation information which may further be carried in each fragmentation includes at least one of the following items: total fragmentations, current fragmentation index, and configuration change count. The BS transmits all neighborhood broadcast message fragmentations to the mobile station through the broadcast way.

S603: the mobile station receives any neighborhood broadcast message fragmentation and acquires the fragmentation information.

During specific implementation, the mobile station acquires total fragmentations, current fragmentation index and configuration change count, and compares whether the count is equal to the value of the count saved last time. If the count is equal to the value of the count saved last time, it is indicated that the neighborhood broadcast message is not change, so it is unnecessary to analyze other information of this fragmentation and all subsequent fragmentations. If the configuration change count received this time is added by 1 when compared with the value of the count saved last time, it is indicated that the neighborhood broadcast message is changed once, so it continuously analyzes the indication information which indication whether the current fragmentation is changed, if the current fragmentation is not changed, it is unnecessary to analyze other information of this fragmentation, the mobile station continuously receives the subsequent fragmentations. If the current fragmentation is changed, the mobile station analyzes and saves the fragmentation information, and continues to receive the subsequent fragmentations. The processes of receiving and analyzing the subsequent fragmentations are similar to those for the first fragmentation. If the difference between the change count received this time and the value saved last time is larger than 1, it is indicated that the neighborhood broadcast message is changed many times and the mobile station is failed to receive. At this moment, the mobile station needs to receive and analyze all fragmentations to acquire the updated neighborhood broadcast message. The mobile station judges whether all neighborhood broadcast message fragmentations are received according to the total fragmentations and fragmentation indexes.

Embodiment 6

Figure 7:
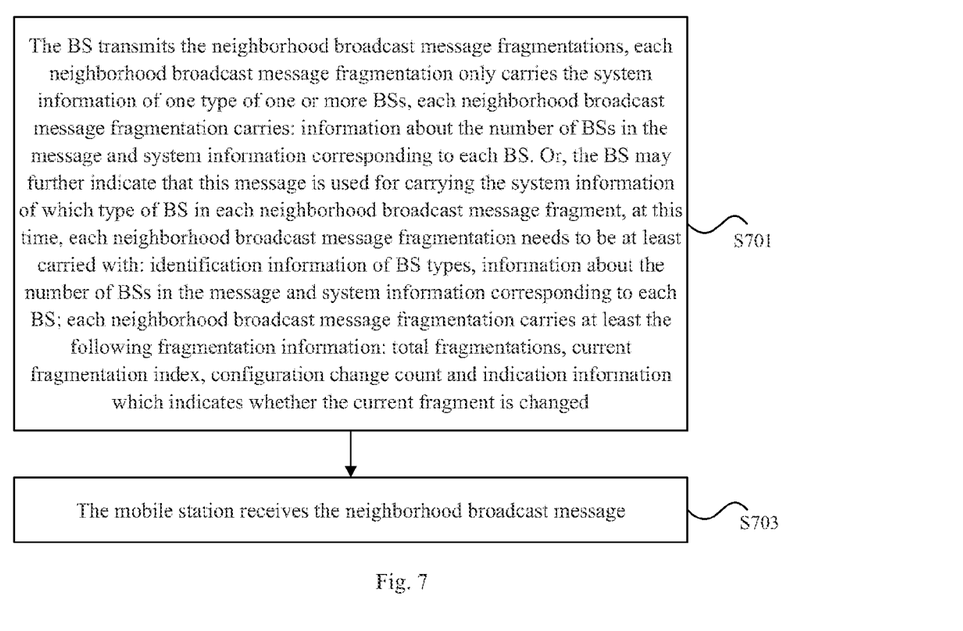
FIG. 7 shows a flow diagram of a method for transmitting and receiving network topology information according to Embodiment 6 of the present invention.

FIG. 7 shows a flow diagram of the method for transmitting and receiving network topology information according to embodiment 6 of the present invention. As shown in FIG. 7, the method for transmitting network topology information according to embodiment 6 of the present invention comprises the following processing (S701-S703).

S701: a neighborhood broadcast message caring network topology information is fragmented, according to BS types, wherein each neighborhood broadcast message fragmentation carries the system information of one or more BSs of only one type, that is, the system information of one or more BSs of a same type can be transmitted in one or more neighborhood broadcast message fragmentations.

A corresponding relationship between the fragmentations and the types of the BSs may be preset, or, notified to a mobile station by the BS in a broadcast type message or channel. For example, the corresponding relationship is transmitted to the mobile station in SFH or AAI-SCD message. At this case, each neighborhood broadcast message fragmentation carries at least one of the following items: information of number of BSs in the message and system information corresponding to each BS. Or, the BS may further indicate that this message is used for carrying the system information of which type of BS in each neighborhood broadcast message fragment. At this time, each neighborhood broadcast message fragmentation carries at least one of the following items: identification information of BS types, information of number of BSs in the message and system information corresponding to each BS.

The BS carries the indication information which indicates whether the current fragmentation is changed in each neighborhood broadcast message fragmentation sent to the mobile station. Fragmentation information which may further be carried in each fragmentation includes at least one of the following items: total fragmentations, current fragmentation index, and configuration change count. The BS transmits all neighborhood broadcast message fragmentations to the mobile station through the broadcast way.

S703: if the mobile station is not limited to switch to a certain special type of BSs, the mobile station receives any neighborhood broadcast message fragmentation, acquires total fragmentations, current fragmentation index, and configuration change count, and compares whether the count is equal to the value of the count saved last time. If the count is equal to the value of the count saved last time, it is indicated that the neighborhood broadcast message is not changed, so it is unnecessary to analyze other information of this fragmentation and all subsequent fragmentations. If the configuration change count received this time is added by 1 when compared with the value of the count saved last time, it is indicated that the neighborhood broadcast message is changed once, so it continuously analyzes the indication information which indication whether the current fragmentation is changed, if the current fragmentation is not changed, it is unnecessary to analyze other information of this fragmentation, the mobile station continuously receives the subsequent fragmentations. If the current fragmentation is changed, the mobile station analyzes and saves the fragmentation information, and continues to receive the subsequent fragmentations. The processes of receiving and analyzing the subsequent fragmentations are similar to those for the first fragmentation. If the difference between the change count received this time and the value saved last time is larger than 1, it is indicated that the neighborhood broadcast message is changed many times and the mobile station is failed to receive. At this case, the mobile station needs to receive and analyze all fragmentations to acquire the updated neighborhood broadcast message. The mobile station judges whether all neighborhood broadcast message fragmentations are received according to the total fragmentations and fragmentation indexes.

If the mobile station just needs to switch to a certain special type of BS, for example, a pico BS. As the mobile station has acquired the corresponding relationship between the fragmentations and the types of BSs, after receiving the neighborhood broadcast message fragmentation, the mobile station judges whether the fragmentation is a pico BS fragmentation according to the fragmentation index. If the fragmentation is not a pico BS fragmentation, it does not analyze other contents of the current fragmentation. If the fragmentation is a pico BS fragmentation, it continuously acquires the configuration change count and compares whether the count is equal to the value of the count saved last time. If the count is equal to the value of the count saved last time, it is indicated that the neighborhood broadcast message is not changed, so it is unnecessary to analyze other information of this fragmentation and all subsequent fragmentations. If the configuration change count received this time is added by 1 when compared with the value of the count saved last time, it is indicated that the neighborhood broadcast message is changed once, so the mobile station continuously analyzes the indication information which indication whether the current fragmentation is changed, judges whether the current pico BS fragmentation is changed according to the indication information, and analyzes other information of the current fragmentation if determining that the current pico BS fragmentation is changed, if the current pico BS fragmentation is not changed, the mobile station receives the next pico BS fragmentation according to above method and judges according to the indication information which indicates whether the current fragmentation is changed, the subsequent operations are the same as the forging descriptions, which will not be described again herein. If the difference between the configuration change count received this time and the value saved last time is larger than 1, it is indicated that the neighborhood broadcast message is changed many times and the mobile station is failed to receive. At this case, the mobile station needs to receive and analyze all fragmentations to acquire the updated neighborhood broadcast message. The mobile station judges whether all neighborhood broadcast message fragmentations are received according to the total fragmentations and fragmentation indexes.

In conclusion, in aid of at least one technical solution provided in the embodiments of the present invention, the mobile station can perform operations related to handover, such as scanning of a neighborhood BS, without needing to receive all neighborhood broadcast messages fragmentations, therefore the problem of long time delay of the information acquisition and subsequent operation can be avoided.

Embodiment 7

Figure 8:
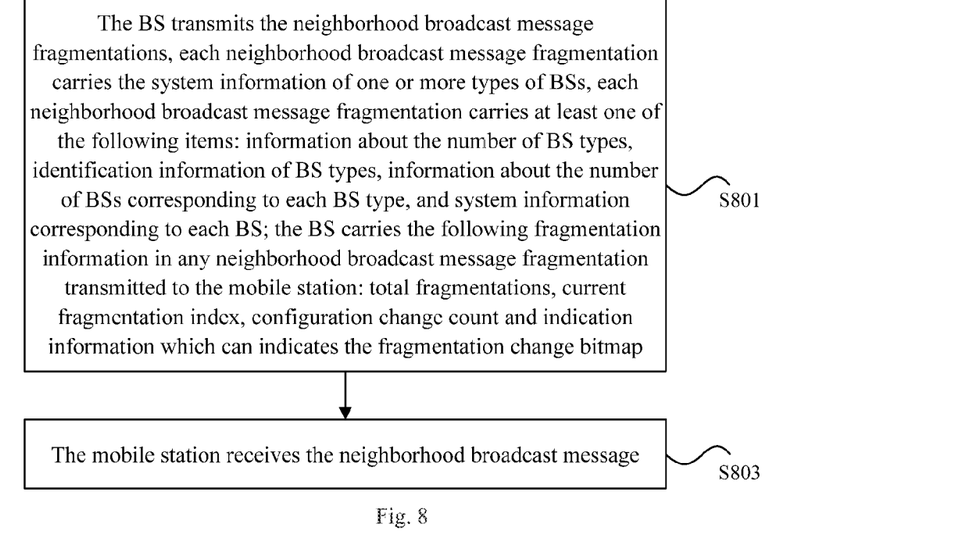
FIG. 8 shows a flow diagram of a method for transmitting and receiving network topology information according to Embodiment 7 of the present invention.

FIG. 8 shows a flow diagram of a method fir transmitting and receiving network topology information according to embodiment 7 of the present invention. As shown in FIG. 8, the method for transmitting network topology information according to embodiment 7 of the present invention comprises the following processing (S801-S803).

S801: a BS transmits neighborhood broadcast message fragmentations (AAI_NBR-ADV message) carrying network topology information, wherein each neighborhood broadcast message fragmentation carries system information of one or more types of BSs.

Preferably, each neighborhood broadcast message fragmentation carries at least one of the following parameters: information of number of BS types, identification information of BS types, information of number of BSs corresponding to each BS type, and system information corresponding to each BS. The BS types comprise at least one of the following: macro BS, micro BS, pico BS, femto BS and relay station.

During specific implementation, the BS carries a fragmentation change bitmap in each neighborhood broadcast message fragmentation sent to a mobile station. Fragmentation information which may further be carried in each fragmentation includes at least one of the following items: total fragmentations, current fragmentation index, configuration change count of neighborhood broadcast information, and identification information which indicates whether the fragmentation change bitmap is carried in the fragmentation.

Preferably, the BS transmits all neighborhood broadcast message fragmentations to the mobile station through the broadcast way.

S803: the mobile station receives any neighborhood broadcast message fragmentation, acquires total fragmentations, current fragmentation index, and configuration change count, and compares whether the count is equal to the value of the count saved last time. If the count is equal to the value of the count saved last time, it is indicated that the neighborhood broadcast message is not changed, so it is unnecessary to analyze other information of this fragmentation and all subsequent fragmentations. If the configuration change count received this time is added by 1 when compared with the value of the count saved last time, it is indicated that the neighborhood broadcast message is changed once, so to the mobile station continuously analyzes the identification information which indicates whether the fragmentation change bitmap is carried in the fragmentation. If the identification information indicates that the current fragmentation carries the fragmentation change bitmap, the mobile station continues to analyze the fragmentation change bitmap, judges which fragments are changed according to the value of the bitmap, and only analyze the changed fragmentations. If the identification information indicates that the current fragmentation does not carry the fragmentation change bitmap, the mobile station receives and analyzes other information of the current fragmentation, then receives the next fragmentation, and finally analyzes the identification information which indicates that whether the fragmentation change bitmap is carried, the subsequent steps are similar to the forging descriptions, which will not be described again herein.

If the difference between the change count received this time and the value saved last time is larger than 1, it is indicated that the neighborhood broadcast message is changed many times and the mobile station is failed to receive. At this case, the mobile station needs to receive and analyze all fragmentations to acquire the updated neighborhood broadcast message. The mobile station may judge whether all neighborhood broadcast message fragmentations are received according to the total fragmentations and fragmentation indexes.

In this way, in a normal case, that is, when the neighborhood broadcast message is changed once, the mobile station can quickly judge whether there are fragmentations are changed and acquire the changed fragmentation indexes according to the fragmentation information carried in the neighborhood broadcast message fragmentation. Therefore the mobile station can acquire the updated network topology information without receiving all neighborhood broadcast message fragmentations, so as to perform operations related to handover, such as scanning.

According to an embodiment of the present invention, a device for fragmenting network topology information is provided.

The device for fragmenting network topology information according to the embodiment of the invention is configured to fragment a neighborhood broadcast message carrying network topology information, wherein at least one of the fragmentations carries indication information which can indicate the changed fragmentations.

Preferably, radio communication systems applying the device include but not limited to: WiMAX, GSM, CDMA, PHS, EDGE, CDMA2000, TD-SCDMA, HSPA, WCDMA, EVDO, HSOPA and LTE.

Preferably, the basis for fragmenting by the device may be: BS types carried in the neighborhood broadcast message, or the size of current resources allocated by a service BS for transmitting a broadcast message.

Through the embodiment, the fragmenting device carries the indication information which can indicate the changed fragmentations in at least one of all fragmentations of the neighborhood broadcast message, so that the mobile station can perform operations related to handover, such as scanning of a neighborhood BS, without needing to receive all neighborhood broadcast messages fragmentations. Therefore, the problem of long time delay of the information acquisition and subsequent operation can be avoided.

According to an embodiment of the present invention, a device for transmitting network topology information is provided.

The device for transmitting network topology information according to the embodiment of the present invention is configured to transmit each fragmentation of a neighborhood broadcast message to a mobile station, wherein at least one of the fragmentations carries indication information which can indicate the changed fragmentations.

Through the embodiment, the provided device for transmitting network topology information carries the indication information which can indicate the changed fragmentations in at least one of all fragmentations of the neighborhood broadcast message. The problem in the relevant art, when the BS transmits a network topology message to a mobile station, the mobile station may perform relevant operations only after receiving all neighborhood broadcast message fragmentations, is solved. Further, the time delay of the information acquisition and subsequent operation can be reduced.

Preferably, radio communication systems applying the device include but not limited to: WiMAX, GSM, CDMA, PHS, EDGE, CDMA2000, TD-SCDMA, HSPA, WCDMA, EVDO, HSOPA and LTE.

Preferably, the sent indication information which can indicate the changed fragmentations may be one of the following items: indication information which indicates whether each one of all fragmentations is changed, and indication information which indicates whether a current fragmentation is changed.

Preferably, according to a preset rule, the indication information, which indicates whether each one of all fragmentations is changed, is carried in one or more fragmentations of the neighborhood broadcast message for transmission, or is carried in any fragmentation of the neighborhood broadcast message for transmission.

In the above, the indication information may be transmitted according to one of the following preset rules:

(1) the indication information is carried in the first fragmentation of the neighborhood broadcast message for transmission;

(2) the indication information is carried in each fragmentation of the neighborhood broadcast message for transmission;

(3) the indication information is carried in any fragmentation of the neighborhood broadcast message for transmission.

In the above, when the indication information is carried in any fragmentation (may be any one or more fragmentations) of the neighborhood broadcast message for transmission, each fragmentation needs to be carried with: identification information which indicates whether the indication information is carried in the fragmentation.

Preferably, the indication information, which indicates whether the current fragmentation is changed, may be transmitted through the following way: the BS carrying the indication information in each fragmentation of the neighborhood broadcast message for transmission.

Preferably, the sent fragmentation information may further include at least one of the following items: total fragmentations, current fragmentation index, and a configuration change count of the neighborhood broadcast message.

Therefore, by different configurations of fragmentation information and using different transmission ways for different configurations of fragmentation information, many selectable solutions for transmitting neighborhood broadcast message fragments can be obtained. When above solutions are used, the mobile station can perform operations related to handover, such as scanning of a neighborhood BS, without needing to receive all neighborhood broadcast messages fragmentations, therefore the problem of long time delay of the information acquisition and subsequent operation can be avoided.

Though the device for transmitting a neighborhood broadcast message is provided in above embodiment, the device carries the indication information which can indicate the changed fragmentations in at least one of all fragmentations of the neighborhood broadcast message, wherein the indication information may include: indication information which indicates whether each one of all fragmentations is changed. Or the indication information may include: indication information which indicates whether the current fragmentation is changed. During receiving, the mobile station can perform operations related to handover, such as scanning of a neighborhood BS, without needing to receive all neighborhood broadcast messages fragmentations, therefore the problem of long time delay of the information acquisition and subsequent operation can be avoided.

According to an embodiment of the present invention, a device for receiving network topology information is provided.

The device for receiving network topology information according to the embodiment of the present invention is configured to receive fragmentations of a neighborhood broadcast message carrying network topology information, wherein at least one of the fragmentations carries indication information which can indicate changed fragmentations.

During specific implementation, the receiving device (for example, mobile station) can combine the fragmentations into partial or complete neighborhood broadcast message according to the indication information carried in the received fragmentations. Please refer to descriptions in FIG. 2 to FIG. 8 for specific process, which will not be described again herein.

Through the embodiment, a device for receiving network topology information is provided, which is matched with the device for transmitting network topology information. During receiving process, the receiving device can perform operations related to handover, such as scanning of a neighborhood BS, without needing to receive all neighborhood broadcast messages fragmentations, therefore the problem of long time delay of the information acquisition and subsequent operation can be avoided.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention. For those skilled in the art, the present invention may have various changes and variations. Any amendments, equivalent substitutions, improvements, etc. within the principle of the present invention are all included in the scope of the protection of the present invention.

What is claimed is:

1. A method for transmitting network topology information, comprising:
   a base station (BS) transmitting fragmentations of a neighborhood broadcast message carrying network topology information;
   wherein at least one of the fragmentations carries indication information which indicates changed fragmentations.

2. The method according to claim 1, wherein the indication information comprises one of the following items:
   indication information which indicates whether each one of all the fragmentations is changed, and indication information which indicates whether a current fragmentation is changed.

3. The method according to claim 2, wherein,
   fragmentation information carried in the fragmentations further comprises at least one of the following: the number of total fragmentations, current fragmentation index, and configuration change count of the neighborhood broadcast message; and/or,
   the indication information, which indicates whether each one of all the fragmentations is changed, is transmitted through the following way: according to a preset rule, the indication information, which indicates whether each one of all the fragmentations is changed, is carried in one or more fragmentations of the neighborhood broadcast message for transmission; and/or,
   the indication information, which indicates whether the current fragmentation is changed, is transmitted through the following way: the BS carrying the indication information in each fragmentation of the neighborhood broadcast message for transmission.

4. The method according to claim 3, wherein the preset rule comprises one of the following items:
   the BS carrying the indication information in the first fragmentation of the neighborhood broadcast message for transmission;
   the BS carrying the indication information in each fragmentation of the neighborhood broadcast message for transmission;
   the BS carrying the indication information in any fragmentation of the neighborhood broadcast message for transmission.

5. The method according to claim 4, wherein when the BS carries the indication information in any fragmentation of the neighborhood broadcast message for transmission, each fragmentation of the neighborhood broadcast message further needs to be carried with: identification information which indicates whether the indication information is carried.

6. The method according to claim 5, wherein,
   when the BS transmits each fragmentation of the neighborhood broadcast message through a broadcast way, the BS transmits each fragmentation in same or different periods; and/or, when the BS transmits each fragmentation of the neighborhood broadcast message through the unicast way, the BS transmits each fragmentation as response to a request of a mobile station; or the BS actively transmits each fragmentation to the mobile station.

7. The method according to claim 6, wherein when the BS transmits each fragmentation in different periods, the BS determines the different periods according to a neighborhood BS type and/or size of coverage range of a neighborhood BS carried in each fragment.

8. The method according to claim 4, wherein,
when the BS transmits each fragmentation of the neighborhood broadcast message through a broadcast way, the BS transmits each fragmentation in same or different periods; and/or,
when the BS transmits each fragmentation of the neighborhood broadcast message through the unicast way, the BS transmits each fragmentation as response to a request of a mobile station; or the BS actively transmits each fragmentation to the mobile station.

9. The method according to claim 8, wherein when the BS transmits each fragmentation in different periods, the BS determines the different periods according to a neighborhood BS type and/or size of coverage range of a neighborhood BS carried in each fragment.

10. The method according to claim 3, wherein,
when the BS transmits each fragmentation of the neighborhood broadcast message through a broadcast way, the BS transmits each fragmentation in same or different periods; and/or,
when the BS transmits each fragmentation of the neighborhood broadcast message through the unicast way, the BS transmits each fragmentation as response to a request of a mobile station; or the BS actively transmits each fragmentation to the mobile station.

11. The method according to claim 10, wherein when the BS transmits each fragmentation in different periods, the BS determines the different periods according to a neighborhood BS type and/or size of coverage range of a neighborhood BS carried in each fragment.

12. The method according to claim 2, wherein,
when the BS transmits each fragmentation of the neighborhood broadcast message through a broadcast way, the BS transmits each fragmentation in same or different periods; and/or,
when the BS transmits each fragmentation of the neighborhood broadcast message through the unicast way, the BS transmits each fragmentation as response to a request of a mobile station; or the BS actively transmits each fragmentation to the mobile station.

13. The method according to claim 12, wherein when the BS transmits each fragmentation in different periods, the BS determines the different periods according to a neighborhood BS type and/or size of coverage range of a neighborhood BS carried in each fragment.

14. The method according to claim 1, wherein,
when each fragmentation of the neighborhood broadcast message carries system information of at least one type of BS, each fragmentation of the neighborhood broadcast message further carries at least one of the following parameters:
information of number of BS types, identification information of BS types, information of number of BSs corresponding to each BS type, and system information corresponding to each BS; and/or,
when each fragmentation of the neighborhood broadcast message carries system information of only one type of BS, each fragmentation of the neighborhood broadcast message further carries with at least one of the following parameters: identification information of the BS type, information of number of BSs, and system information corresponding to each BS; and/or,
when each fragmentation of the neighborhood broadcast message carries system information of only one type of BS, and a mobile station obtains a corresponding relationship between the fragmentation and the BS type, each fragmentation of the neighborhood broadcast message further carries with at least one of the following parameters: information of number of BSs and system information corresponding to each BS.

15. The method according to claim 14, wherein the mobile station obtains the corresponding relationship between the fragmentation and the BS type through at least one of the following ways:
the mobile station obtaining the corresponding relationship which is preset;
the mobile station receiving the corresponding relationship sent by the BS in a broadcast type message or channel.

16. The method according to claim 15, wherein,
when the BS transmits each fragmentation of the neighborhood broadcast message through a broadcast way, the BS transmits each fragmentation in same or different periods; and/or,
when the BS transmits each fragmentation of the neighborhood broadcast message through the unicast way, the BS transmits each fragmentation as response to a request of a mobile station; or the BS actively transmits each fragmentation to the mobile station.

17. The method according to claim 16, wherein when the BS transmits each fragmentation in different periods, the BS determines the different periods according to a neighborhood BS type and/or size of coverage range of a neighborhood BS carried in each fragment.

18. The method according to claim 15, wherein,
when the BS transmits each fragmentation of the neighborhood broadcast message through a broadcast way, the BS transmits each fragmentation in same or different periods; and/or,
when the BS transmits each fragmentation of the neighborhood broadcast message through the unicast way, the BS transmits each fragmentation as response to a request of a mobile station; or the BS actively transmits each fragmentation to the mobile station.

19. The method according to claim 18, wherein when the BS transmits each fragmentation in different periods, the BS determines the different periods according to a neighborhood BS type and/or size of coverage range of a neighborhood BS carried in each fragment.

20. The method according to claim 14, wherein,
when the BS transmits each fragmentation of the neighborhood broadcast message through a broadcast way, the BS transmits each fragmentation in same or different periods; and/or,
when the BS transmits each fragmentation of the neighborhood broadcast message through the unicast way, the BS transmits each fragmentation as response to a request of a mobile station; or the BS actively transmits each fragmentation to the mobile station.

21. The method according to claim 20, wherein when the BS transmits each fragmentation in different periods, the BS determines the different periods according to a neighborhood BS type and/or size of coverage range of a neighborhood BS carried in each fragment.

22. The method according to claim 1, wherein, before the BS transmitting fragmentations of a neighborhood broadcast message carrying network topology information, the method comprising:
fragmenting the neighborhood broadcast message carrying network topology information;
wherein, at least one of the fragmentations carries the indication information which indicates changed fragmentations.

23. The method according to claim 22, wherein fragmenting the neighborhood broadcast message comprises one of the following steps:
fragmenting the neighborhood broadcast message according to BS types carried in the neighborhood broadcast message;
fragmenting the neighborhood broadcast message according to size of the current resources used for transmitting a broadcast message by a service BS.

24. An apparatus used for carrying out the method of claim 1, wherein the apparatus comprises the BS and the apparatus is configured to transmit each fragmentation of the neighborhood broadcast message to a mobile station, wherein at least one of the fragmentations carries indication information which indicates changed fragmentations.

25. A method for receiving network topology information, comprising:
a mobile station receiving fragmentations of a neighborhood broadcast message carrying network topology information;
wherein at least one of the fragmentations carries indication information which indicates changed fragmentations.

26. An apparatus used for carrying out the method of claim 25, wherein the apparatus comprises the mobile station and the apparatus is configured to receive the fragmentations of the neighborhood broadcast message carrying network topology information, wherein at least one of the fragmentations carries indication information which indicates changed fragmentations.

27. A base station (BS) wherein the BS is configured to transmit each fragmentation of a neighborhood broadcast message to a mobile station, wherein at least one of the fragmentations carries indication information which indicates changed fragmentations.

28. The BS according to claim 27, wherein, the BS is further configured to fragment the neighborhood broadcast message carrying network topology information, wherein at least one of the fragmentations carries the indication information which indicates changed fragmentations.

* * * * *